(12) United States Patent
Lawson, Jr.

(10) Patent No.: US 8,292,769 B2
(45) Date of Patent: Oct. 23, 2012

(54) TRANSMISSION

(76) Inventor: Thomas Towles Lawson, Jr., Charlottesville, VA (US)

( * ) Notice: Subject to any disclaimer, the term of this patent is extended or adjusted under 35 U.S.C. 154(b) by 383 days.

(21) Appl. No.: 12/697,640

(22) Filed: Feb. 1, 2010

(65) Prior Publication Data

US 2010/0190604 A1    Jul. 29, 2010

Related U.S. Application Data

(63) Continuation-in-part of application No. 11/942,961, filed on Nov. 20, 2007, now abandoned.

(60) Provisional application No. 60/866,993, filed on Nov. 22, 2006.

(51) Int. Cl.
*F16H 3/72* (2006.01)
*F16H 37/08* (2006.01)

(52) U.S. Cl. .................. 475/5; 475/9; 475/201

(58) Field of Classification Search .......... 475/5, 6, 475/9, 151, 201, 218, 225
See application file for complete search history.

(56) References Cited

U.S. PATENT DOCUMENTS

| | | | |
|---|---|---|---|
| 2,386,540 A | 10/1945 | Campodonico | |
| 5,823,281 A | 10/1998 | Yamaguchi et al. | |
| 6,327,935 B1 | 12/2001 | Joslin et al. | |
| 6,428,438 B1 | 8/2002 | Bowen | |
| 6,478,705 B1 | 11/2002 | Holmes et al. | |
| 6,631,651 B2 | 10/2003 | Petrzik | |
| 6,811,508 B2 | 11/2004 | Tumback | |
| 6,852,054 B2 * | 2/2005 | Tumback et al. | 475/5 |
| 6,957,731 B2 | 10/2005 | Lawson, Jr. | |
| 7,073,407 B2 | 7/2006 | Stefina | |
| 7,107,870 B2 | 9/2006 | Kuhstrebe et al. | |
| 7,155,993 B2 | 1/2007 | Koenig et al. | |
| 7,163,480 B2 | 1/2007 | Supina et al. | |
| 7,220,200 B2 | 5/2007 | Sowul et al. | |
| 7,261,660 B2 | 8/2007 | Sowul et al. | |
| 7,300,374 B2 | 11/2007 | Bucknor et al. | |
| 7,631,719 B2 * | 12/2009 | Wenthen | 180/243 |
| 2003/0069103 A1 * | 4/2003 | Ibamoto et al. | 475/5 |
| 2003/0199353 A1 | 10/2003 | Bowen | |
| 2005/0288149 A1 | 12/2005 | Kuhstrebe et al. | |
| 2006/0101932 A1 | 5/2006 | McCrary | |

* cited by examiner

*Primary Examiner* — Edwin A Young
(74) *Attorney, Agent, or Firm* — Laubscher & Laubscher, P.C.

(57) ABSTRACT

A motor vehicle transmission includes a power splitter connected with the vehicle engine and having two outputs. A differential and a clutch are connected with the outputs of the splitter. Separate gearboxes including alternating sequential gear mechanisms are connected with the differential and clutch. The differential and clutch are independently operated under control of an electronic control unit to provide continuous flow of power from the engine to the gearboxes which may be simultaneously operated.

10 Claims, 5 Drawing Sheets

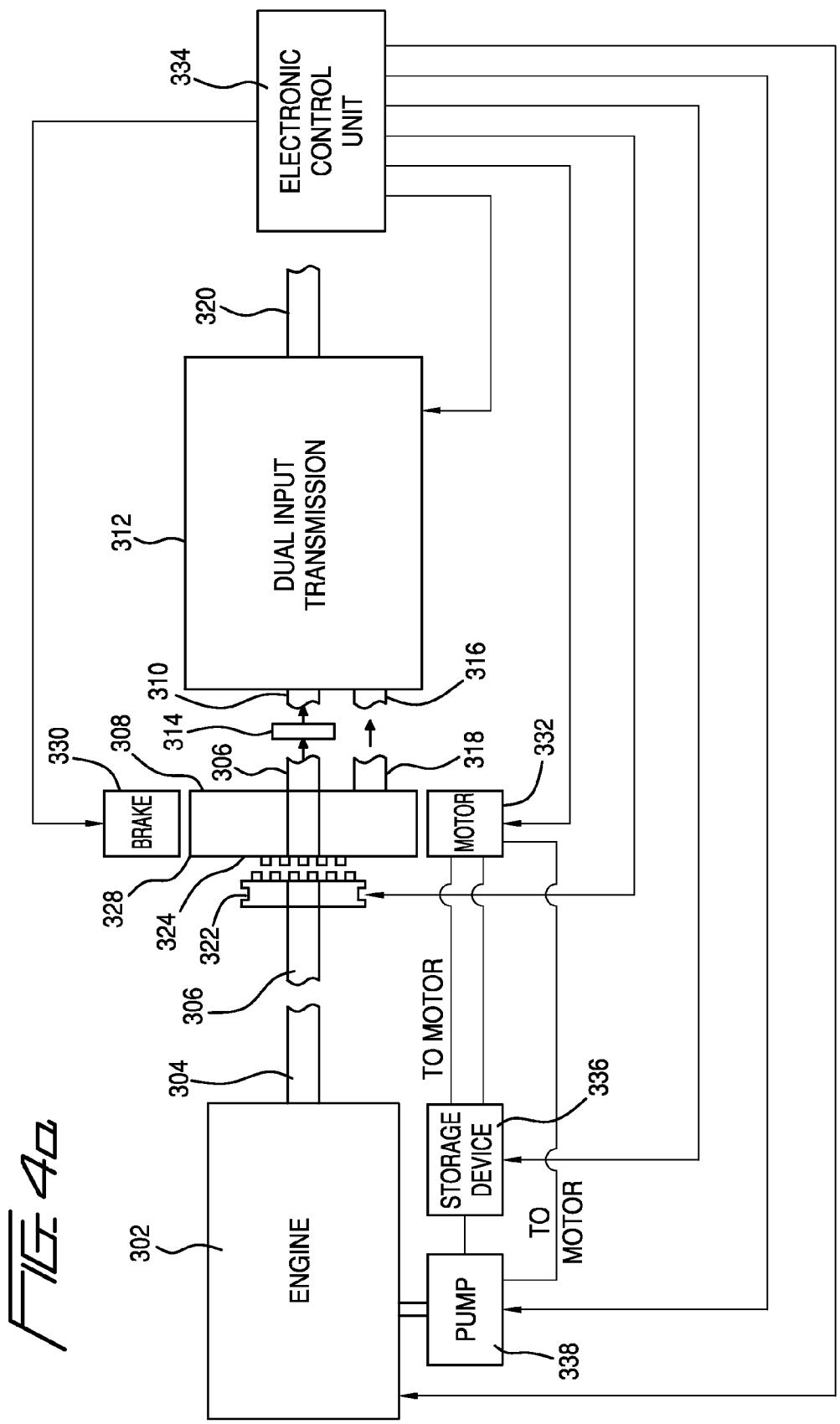

TRANSMISSION

This application is a continuation-in-part of U.S. patent application Ser. No. 11/942,961 filed Nov. 20, 2007 which claims the benefit of U.S. provisional application No. 60/866,993 filed Nov. 22, 2006.

BACKGROUND OF THE INVENTION

The two primary types of transmissions for vehicles are manual and automatic transmissions. In a manual transmission, a gear box contains a plurality of gears and a clutch mechanism is used to engage and disengage the gears upon manual operation of a shift lever by the operator. In an automatic transmission, planetary gears and a torque converter are used to shift the gears automatically in accordance with the speed of the vehicle and the speed of the engine used to propel the vehicle.

Traditional manual transmissions are more efficient and provide more vehicle control with reduced reliance on the brakes of a vehicle. Automatic transmissions are generally easier to operate and the torque converter acts as a non-rigid link between the engine and the drive shaft to protect the power train of the vehicle and reduce shock during shifting of the gears. A major drawback of the automatic transmission is the tendency for the torque converter to slip which reduces its efficiency.

The present invention relates to an improved transmission which combines the benefits of the manual and automatic transmissions without the need for traditional clutches and torque converters.

BRIEF DESCRIPTION OF THE PRIOR ART

Recent advancements in both manual and automatic transmissions have incorporated computer controls and links between the engine control computer and the transmission control computer. One advancement is the automated (as opposed to automatic) manual transmission (AMT). An AMT includes the basic components of a manual transmission, the clutch and gearbox, but a computer controls actuators which physically move the gear shift forks to change gears, thereby obviating the need for a clutch pedal. Automated manual transmissions still incur a pause between shifting of the gears and the pressure plate of the clutch acts on the engine's flywheel, thus generating unwanted longitudinal thrust. However, the cost of an automated manual transmission can be 1/10 the cost of a comparable automatic transmission.

Also known in the art are transmissions having two gearboxes with interspersed gear ratios and a dual clutch mechanism. One gearbox has first, third and fifth gears driven by one clutch and the other gearbox has second, fourth, and sixth gears driven by the other clutch. A computer determines which gear to pre-select, manipulates the engine for shifting of the gears, and controls the clutches to implement the shift. The clutches engage and disengage their respective gears simultaneously so that flow of power from the engine to the drive wheels is uninterrupted. The computer can control the entire process automatically or by responding to signals from the operator. The dual clutch transmission can be disassociated from the engine flywheel in order to eliminate thrust loads on the engine crankshaft.

Computer control of automatic transmissions allows for smoother shifting and more efficient torque converters. In addition, the transmission computer can control the engine computer to temporarily reduce torque output for the duration of a shift. This momentary torque reduction reduces the slip and shock absorption of the torque converter which facilitates its operation.

Gear ratios of an automatic transmission are controlled by friction bands on planetary gear sets. In some applications, the torque converter could be eliminated. However, starting the vehicle from a stopped condition and shock loads are still a problem in such transmissions.

The present invention was developed in order to overcome these and other drawbacks of the prior transmissions by providing a dual gearbox transmission wherein differentials operated by separate motors are used to effect shifting of the gears in each box.

SUMMARY OF THE INVENTION

In accordance with the invention, a transmission is connected with the engine of a vehicle and includes a power splitter connected with the engine and having two outputs. A differential is connected with one of the outputs and a clutch is connected with the other output. Gear mechanisms are connected with the outputs of the differential and clutch. Preferably, each gear mechanism includes gears of different ratios which alternate sequentially. A motor is connected with the differential to provide torque to the differential to control the operation thereof. A controller is connected with the clutch and the differential to control the torque delivered through the differential and clutch to simultaneously control shifting of gears within the gear mechanisms in accordance with operator input.

A brake mechanism under control of the controller is connected between the motor and the respective differential to further control the torque between the motor and the differenctial. Preferably, the motor is a hydraulic motor and a storage device such as a hydraulic reservoir or accumulator is connected with each motor.

In an alternate embodiment of the invention, the transmission includes a drive shaft which is connected with the output of an engine and a dual input transmission has one input connected with the drive shaft. A planetary gear assembly is connected with the drive shaft and has an output connected with a second input of the transmission. A controller is connected with the planetary gear assembly to control the inputs to the dual input transmission.

BRIEF DESCRIPTION OF THE FIGURES

Other objects and advantages of the invention will become apparent from a study of the following specification when viewed in the light of the accompanying drawing, in which:

FIG. 4a is a schematic views of a preferred compact embodiment of the transmission; and FIG. 4b is a view of the planetary gear assembly of FIG. 4a.

DETAILED DESCRIPTION

Figure 1:
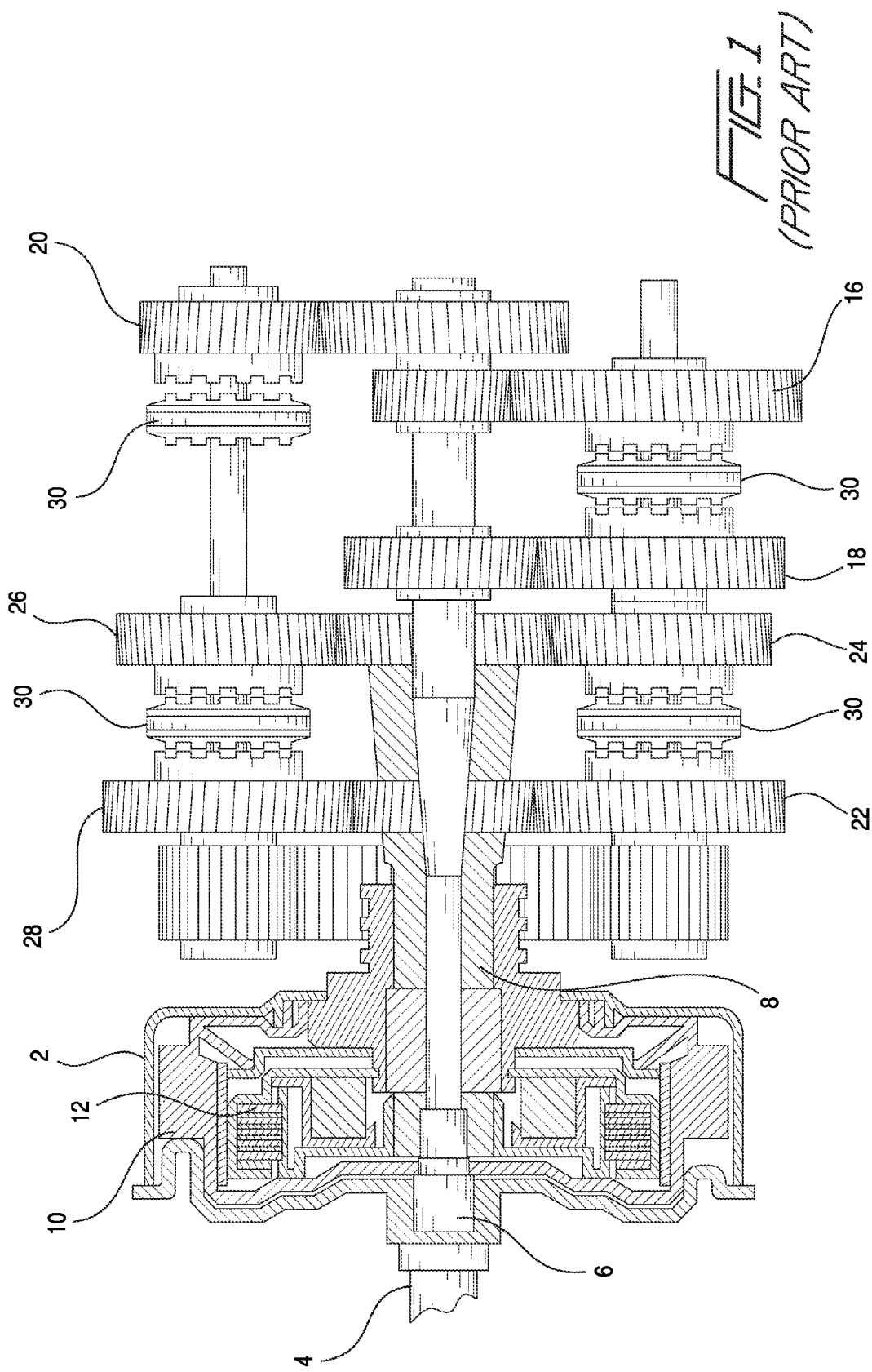
FIG. 1 is a schematic view of a dual clutch transmission according to the prior art.

In FIG. 1 there is shown a dual-clutch or semi-automatic transmission as is known in the prior art. A clutch housing 2 contains a central dual shaft having an input end 4 connected with the engine (not shown) of a vehicle. The shaft is a dual shaft with independently rotating inner 6 and outer 8 portions.

The clutch case contains a first clutch 10 associated with inner shaft 6 and a second clutch 12 which is fixed to outer shaft 8. Six gear sets are connected with the shafts of the clutch case and provide outputs to a differential (not shown) of the engine. First 16, third 18, and fifth 20 gear mechanisms are connected with the inner shaft and second 22, fourth 24, sixth 26, and reverse 28 gear mechanisms are connected with the outer shaft to provide the first through fifth and reverse gears for the transmission. Gear selectors 30 are arranged adjacent to each gear mechanism. Because the clutches operate independently and the gear mechanisms alternate sequentially between the inner and outer shafts, shifting of the gears from first through sixth can overlap without interrupting the power flow from the engine for smooth transition between the gears Turning now to FIG. 2, the transmission according to the present invention will be described. It relates to a dual clutch transmission but with computer controlled differential clutches for improved performance. More particularly, an engine 102 provides power flow to the transmission. A simple power splitter 104 where torque and horsepower are divided equally is connected with the output from the engine to split the power flow in two. A first differential 106 of known type such as epicyclic, spider gear, miter gear or spur gear is connected with one output of the power splitter and a second differential 108 similar to the first differential is connected with the other output of the power splitter. A first gear box 110 is connected with the first differential 106 and a second gearbox 112 is connected with the second differential 108. The gearboxes contain sequentially alternating gear mechanisms. For example, the first gearbox contains mechanisms for second, fourth, and reverse gears, while the second gearbox contains mechanisms for first, third, and fifth gears. Additional (or fewer) gear mechanisms may be provided, depending on the type of vehicle with which the transmission is being used. The outputs of the first and second gearboxes are connected with output gears 114 and 116, respectively, which in turn are geared to one another and connected with a drive shaft 118 of the vehicle.

Each differential includes a drive mechanism to control the operation thereof. More particularly, a first motor 120 is connected with the first differential via a braking device 122. The first motor has a storage device 124 connected thereto. The first differential 106, first motor 120 and braking device 122 operate as a first differential clutch 125. Similarly, a second motor 126 is connected with the second differential via a braking device 128 and a storage device 130 is connected with the second motor. The second differential 108, second motor 126 and braking device 128 operate as a second differential clutch 131. The first and second motors are electric, air or hydraulic motors and the storage devices may be batteries, capacitors, air tanks, or hydraulic reservoir or accumulators depending on the type of motor being used.

In order to control the operation of the transmission, an electronic control unit 132 is provided. This unit receives input from the operator of the vehicle, such as throttle control, brake application, and gear selector input and controls the operation of the clutches and gearboxes accordingly. More particularly, the electronic control unit is connected with the first and second motors 120, 126, the first and second gearboxes, 110, 112, and with brake calipers 134 and 136, respectively, of the braking devices 122, 128. In accordance with signals from the unit, the amount and direction of torque applied by the motors to the associated differentials is controlled to automatically control the shifting of the gear mechanisms in each gearbox.

A further gearbox or clutch 138 may be provided between the power splitter and one of the differentials. In the embodiment shown, the further gearbox is between the power splitter 104 and the second differential 108. When the second gearbox 112 is in neutral, the further gearbox allows rotation to cease in the gearbox to reduce friction. In addition, a further brake mechanism 140 can also be provided to prevent the engine from rotating during certain operating cycles.

The operation of the transmission from standing to cruising speed using maximum acceleration will now be described for an electrical embodiment where the motors 120 and 126 are electric motors and the storage devices 124 and 130 are batteries. First and second gears are simultaneously engaged in gearboxes 112 and 110, respectively. The engine 102 runs at full revolutions per minute. When the service brake is released, the electronic control unit signals negative torque to be applied by the second motor 126. The first and second motors 120 and 126 are spinning because the engine is spinning, but the output shafts from the first and second differentials 106 and 108 are stopped because they are geared through first and second gearboxes 110 and 112, respectively, to the wheels, and the vehicle is stationary. The negative torque applied by the second motor 126 supplies enough load to slow the engine to its torque peak. This generates electricity to the second storage device (battery) 130. Meanwhile, the first motor 120 receives electricity from the storage device (battery) 124 and applies positive torque to its output and the first differential 106 to supplement the torque from the engine 102 while at the same time sending the same amount of negative torque to the first gearbox 110 to operate second gear.

The net effect is to increase the acceleration of the vehicle over what could be achieved by only applying the negative torque of second motor 126 because that torque reacts against the engine torque plus the torque of the first motor 120 and is driving the deeper gear ratio, namely first gear of the second gearbox 112. Depending on the torque available from the second motor 126, activation of the brake caliper 136 may be needed to counteract all of the power coming from the engine.

The vehicle accelerates unless there is wheel spin in which case less torque will be applied by one or both of the first and second motors 120, 126 and/or the throttle opening of the engine is reduced. In addition, negative torque could be applied from the first motor 120 and allow the second gearbox 112 to shift to third gear. This is analogous to a race car driver losing traction and simply going to the next gear rather than modulating the throttle.

The use of the motors 120 and 126 to provide negative torque or braking force has the same affect as engaging the clutch in a traditional manual transmission. The second motor 126 decelerates more quickly than the first motor 120 because the speed of the output shaft from the second differential is higher for a given vehicle speed because of the lower ratio of first gear. The second motor 126 slows to a stop and then begins to spin in the opposite direction, now drawing from the storage device 130 and still applying torque in the same direction with the same force.

Since the second motor 126 is now drawing electricity from the storage device 130, the first motor 120 begins applying negative torque effectively engaging second gear but also generating electricity which is sent to storage device 124. When the second motor 126 approaches its speed limit, the first brake caliper 134 assists the first motor 120 to apply negative torque. This unloads the second differential 108 and the second gearbox 112 so that the second gearbox can be easily shifted to third gear. If the brake caliper 134 is properly modulated, the flow of torque to the drive shaft is uninterrupted. Once third gear is engaged in the second gearbox 112, the second motor 126 begins applying positive torque to the engine 102 and subtracting it from the second gearbox 112.

However, as was the case then the first and second gears were engaged, the torque is multiplied more by the lower gear, in this case the second gear in the first gearbox 110. The first motor 120 is accelerating because brake caliper 134 has been released after the gear shift. As the first motor 120 approaches its speed limit, the brake caliper 136 allows the second motor 126 to unload the first differential 106 and the first gearbox 110 so that fourth gear can be selected in the first gearbox 110. The process is repeated for fourth gear until the first motor 120 is stopped and brake caliper 134 is engaged.

The overall drive ratio is determined so that at cruising speed on flat ground, the engine is at just a high enough revolutions per minute to maintain the cruise at wide open throttle. The additional clutch 138 is a conventional clutch or a simple synchronized single gear power transmitter that is either engaged or not engaged. No significant torque will be transmitted through the additional clutch during its engage or disengaged conditions because all of the torque from the engine is directed through the first differential 106 and first gearbox 110 during this period. The additional clutch 138 is disengaged and the second gearbox 112 is shifted to neutral to eliminate rotation in that part of the drive train during cruising speed.

Cruise is maintained during different driving conditions such as when the vehicle is climbing a hill or into a headwind. When additional load from such conditions is placed on the vehicle, the first brake caliper 134 is released and the first motor 120 spins in order to allow the engine to increase in revolutions per minute. If not enough torque is immediately available, then third gear in the second gearbox 112 is selected and the second motor 126 increases to an appropriate speed to allow easy engagement of the further (input/output) gearbox 138. The second motor 126 now supplies torque to help accelerate the vehicle. At this point, the storage device 124 may not be experience a net loss because the second motor 126 is applying negative torque and therefore generating electricity. The situation where both motors are spinning is employed if the storage device capacity (i.e. battery charge) drops below a minimum. Many different modes can be employed to recharge the storage device. If even more power is needed, the engine revolutions per minute can rise and the second motor 126 can slow to where, if it stops, the vehicle can be said to be in third gear, or further downshifting may occur to select second gear in the first gearbox 110.

In an alternate acceleration mode, the engine 102 remains off and the first and second motors 120 and 126 spin against the engine to drive the vehicle. In order to accomplish this, the further brake mechanism 140 is operated to stop the engine, and thus the power splitter, from spinning.

The electronic control unit 132 uses the first and second motors 120, 126 to synchronize the ground speed and engine speed for a given gear ratio, thus reducing the shift effort and mechanical synchronizer wear. With proper selection and control of the motors, the need for synchronizers may be reduced or eliminated.

Figure 2:
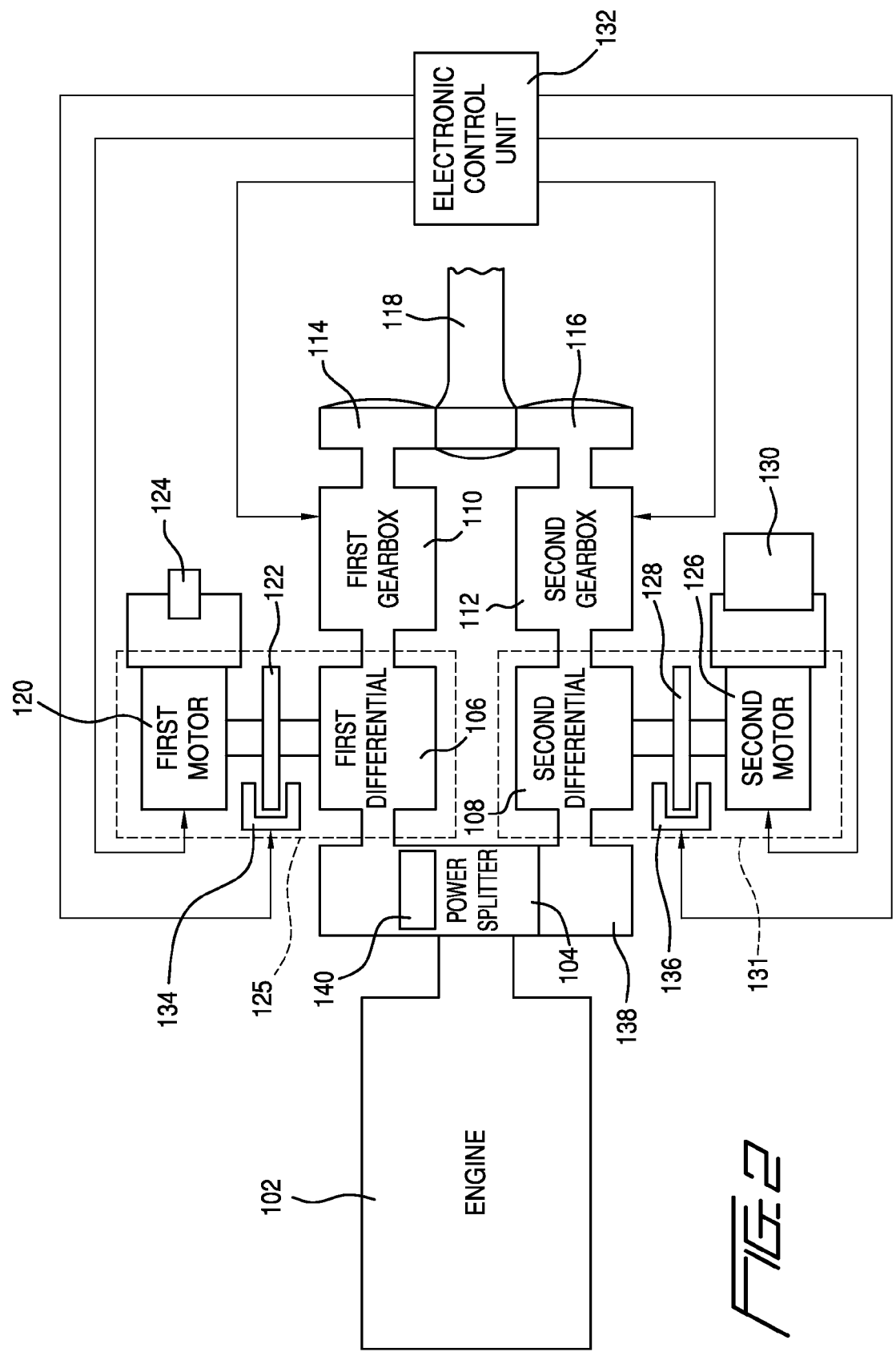
FIG. 2 is a schematic view of a transmission according to a preferred embodiment of the invention.
Figure 3:
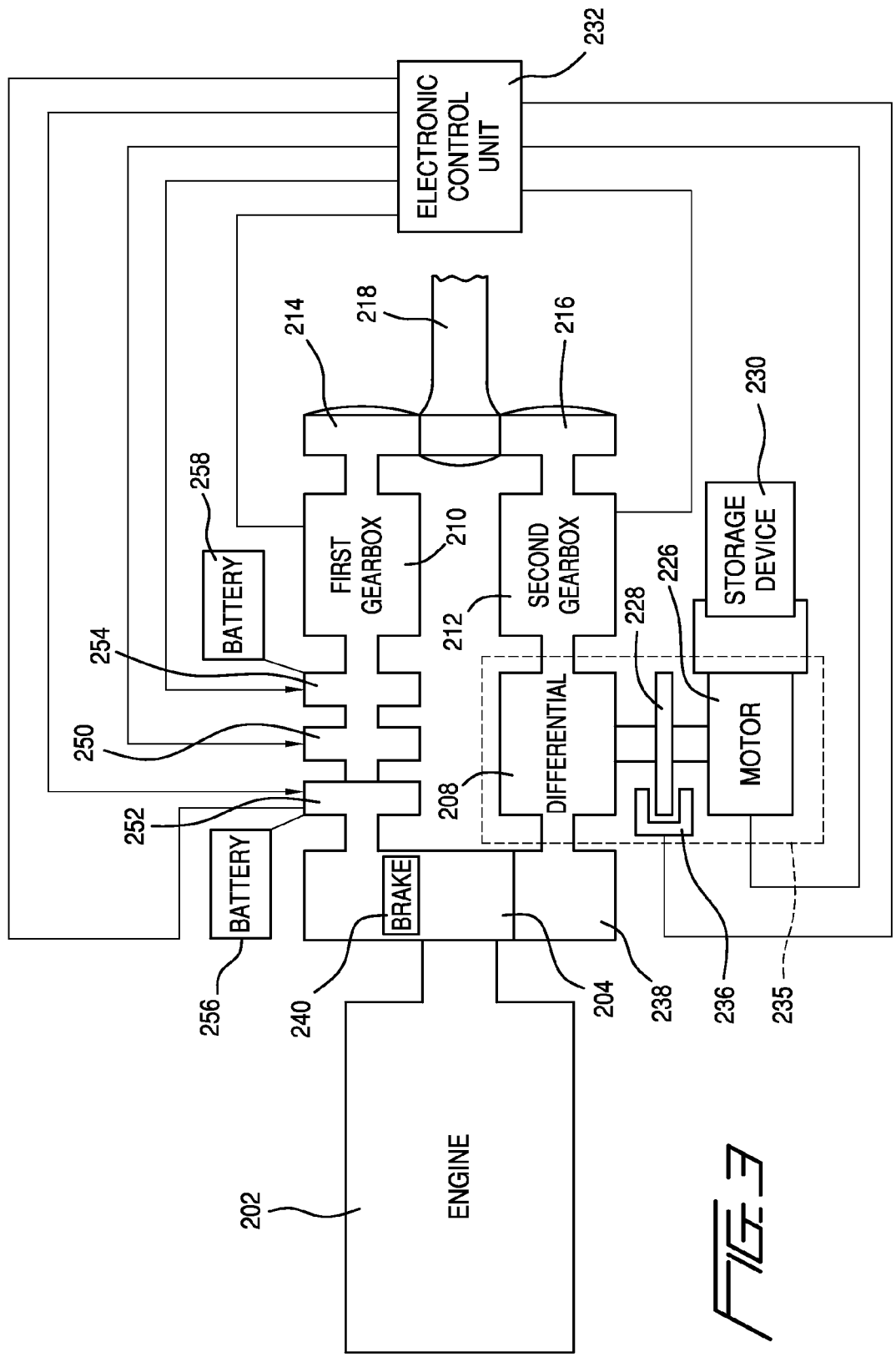
FIG. 3 is a schematic view of a transmission according to an alternate embodiment of the invention.

FIG. 3 shows another embodiment which uses a traditional clutch such as a disk clutch of the single or multiplate type, either dry or wet. Preferably a dry clutch is used because of the lower frictional losses than occur in a wet clutch and because the added cooling abilities of wet clutches are not necessary. While the embodiment drawn in FIG. 2 has many advantages over known systems, including the ability of the engine to operate at a constant desirable RPM, an even simpler system is depicted in FIG. 3.

The bottom half of FIG. 3 is much the same as FIG. 2 but with different reference numbers. An engine 202 provides power flow to the transmission. A simple power splitter 204 where torque and horsepower are divided equally is connected with the output from the engine to split the power flow in two. A clutch 250 is connected to one output of the power splitter 204 and a differential 208 is connected with the other output of the power splitter. A first gear box 210 is connected with the clutch 250 and a second gearbox 212 is connected with the differential 208. The gearboxes contain sequentially alternating gear mechanisms. For example, the first gearbox contains mechanisms for second, fourth, and reverse gears, while the second gearbox contains mechanisms for first, third, and fifth gears. Additional (or fewer) gear mechanisms may be provided, depending on the type of vehicle with which the transmission is being used. The outputs of the first and second gearboxes are connected with output gears 214 and 216, respectively, which in turn are geared to one another and connected with a drive shaft 218 of the vehicle.

The differential 208 includes a drive mechanism to control the operation thereof. A motor 226 is connected with the differential 208 via a braking device 228 including a brake caliper 236 and a storage device 230 is connected with the second motor. The differential 208, motor 226 and braking device 228 operate as a differential clutch 235. The motors are electric, air or hydraulic motors and the storage devices may be batteries, capacitors, air tanks, or hydraulic reservoirs or accumulators depending on the type of motor being used. The braking device need not be of the disk type as depicted. It could be a drum brake or an electric eddy brake, or any other means of stopping a spinning shaft.

The top half of FIG. 3 incorporates a traditional clutch 250 and may also include motors 252, 254 The motors have storage devices such as batteries 256 and 258 connected therewith, respectively. Instead of a traditional clutch a simple synchronized dog gear, or the selective engagement of two spur gears may be provided, depending on the application.

In order to control the operation of the transmission, an electronic control unit 232 is provided. This unit receives input from the operator of the vehicle, such as throttle control, brake application, and gear selector input and controls the operation of the clutches and gearboxes accordingly. Sensors for providing such input from these devices are known and commonly used, so that the electronic control unit 232 can receive signals from a variety of types of sensors without the sensors themselves being inventive. More particularly, the electronic control unit is connected with the motors 226, 252, and 254, the first and second gearboxes, 210, 212, and with the brake caliper 236, respectively, of the braking device 228. In accordance with signals from the electronic control unit, the amount and direction of torque applied by the motors to the associated differential, clutch, gearbox or power splitter is controlled.

It is significant that the first gearbox 210 has even gears because the differential clutch 235 is what should be used to start the vehicle moving from a standstill and should contain first gear. Acceleration from a start using a transmission constructed according to the embodiment depicted in FIG. 3 proceeds as follows. First gear in the second gearbox 212 and second gear in the first gearbox 210 are selected. Clutch 250 is open and the engine is running. Motor 252 spins with the power splitter 204 and gearbox or clutch 238 would be closed between the power splitter and the differential clutch 235. Brake mechanism 240 is not engaged so that the input shafts of clutch 250 and differential clutch 235 are both spinning with the engine.

Upon receiving input from the driver such as movement of the accelerator pedal or release of the brake, motor 226 begins to apply negative torque to the shaft of differential 208 to which the motor 226 is attached. This causes engine torque to be routed through first gear in the second gearbox 212 and to the wheels. In the simplest arrangement, the negative torque would be applied by brake 228 by action of the caliper 236. The motor 226 continues to cause the shaft between it and differential 208 to slow and eventually stop. This process is analogous to clutch engagement in a traditional manual gearbox, except that there is considerable flexibility in the operation. In a traditional manual transmission the engagement should be done at low rpm and partial throttle and as quickly and smoothly as possible, but none of these constraints apply to the present invention.

Once first gear is effectively engaged, a rise in engine RPM causes a proportional increase in vehicle speed. When an appropriate engine speed is reached, whether it be horsepower peak, torque peak or efficiency peak, or whatever is best for a given set of parameters, the motor 226 begins to spin adding torque in the same rotational direction as it was previously, and thus also adds power to the system. The input shaft to differential 208 from motor 226 begins to spin in the opposite direction from what it was originally. This causes the vehicle to continue to accelerate, though the engine speed remains constant. At some speed of the motor 226 as determined by the fixed ratios of the first and second gears, clutch 250 can be engaged with both faces going equal speed. Power flows from the engine to the wheels through clutch 250 and then through second gear in the first gearbox 210. Motor 226 is then manipulated to allow third gear to be selected in the second gearbox 212, and once engine speed has reached its shift point, motor 226 begins to apply negative torque to associated the shaft of differential 208 and the process starts over.

If motors 226, 252, and 254 are eliminated, the system operates like the dual clutch transmission in FIG. 1 except that the primary torque transmission device at the critical start off period of initial acceleration is a brake 228 rather than a clutch which is the drawback of the device in FIG. 1. The advantages of using a braking mechanism rather than a clutch are manifold but two significant facts should be noted. Very rarely are road vehicles designed with clutches that can transmit full engine potential in a partially engaged position. Slipping the clutch with the accelerator in the maximum position burns the clutch up immediately. The clutch engagement should be at an RPM well below the torque peak and at partial throttle. If the vehicle is designed with a very large clutch, the rotating mass is greatly increased which has a much more drastic efficiency and performance penalty than adding non-rotating weight. The brakes on all vehicles are designed to stop the vehicle from any speed much faster than it can accelerate. The brakes are therefore capable of transmitting far greater horsepower than the clutch on a given vehicle.

The brake mechanisms in the present invention can be external to the path of the drive line. Clutch replacement requires breaking the transmission apart from the engine. This is expensive in terms of both time and materials and requires special tools. The inventive system can be made where replacing all or part of the braking elements is much less costly, and might even be performed in the field.

If motors 252 and 254 are provided, motor 252 can drive the vehicle with clutch 250 disengaged and the engine off. Motor 252 may or may not work in conjunction with motor 226 for this purpose of engine off driving. A wide variety of gear ratios may be chosen in these modes. When the first gearbox 210 is in neutral, motor 254 can start the engine if the clutch 250 is engaged, and may be able to drive the vehicle at the same time. Similar advantages are possible if both motors 252 and 254 are included. If neither is included but motor 226 is included, then a transmission which includes only one motor/generator can provide continous power delivery through multiple gear ratios with only one differential/epicyclic gearbox being provided as shown in FIG. 3.

The dual clutch arrangement shown in FIG. 1 is a compact transmission, and the mounting of its two clutches on concentric shafts means that the engine's flywheel is analogous to the power splitter described herein.

Figure 4B:
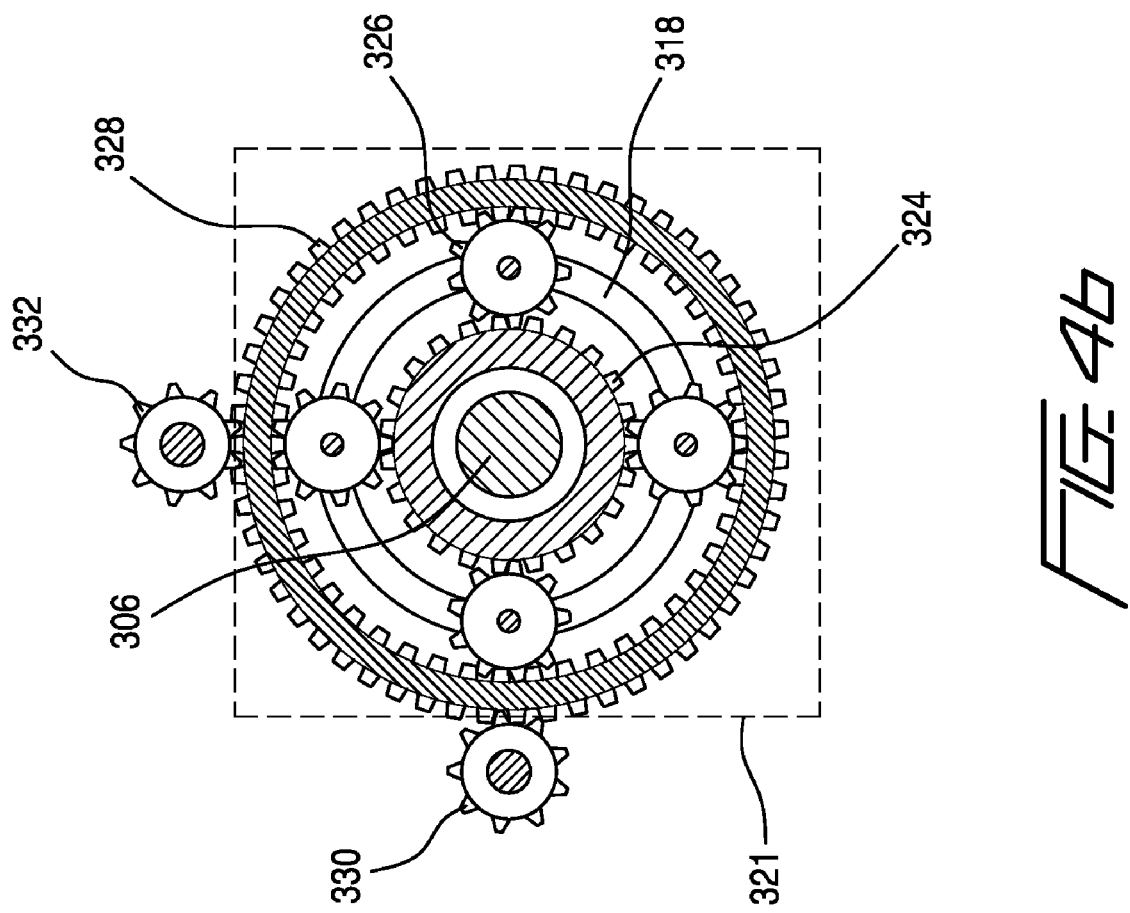

A very compact alternate embodiment of the present invention is shown in FIGS. 4a and 4b. An engine 302 has an output shaft 304. A central shaft 306 is connected with the output shaft. The central shaft is connected with a planetary gear assembly 308 and with a first input shaft 310 to a dual input transmission 312 via a clutch 314. The transmission has a second input shaft 316 connected with a carrier 318 of the planetary gear assembly. The dual input transmission further includes an output shaft 320.

A gear selector 322 is connected with the central shaft 306 via splines (not shown) to control the operation of the planetary gear assembly 308. Referring to FIG. 4b, the planetary gear assembly includes a central sun gear 324 mounted on the central shaft. The sun gear may be integral with the shaft 306 or may contain an opening for receiving the shaft 306. A plurality of planetary gears 326 are connected with the carrier 318 and mesh with the sun gear 324. A ring gear 328 is connected with the planetary gears 326 via teeth on the inner surface of the ring gear. A brake 330 and motor 332 are connected with the ring gear via teeth on the outer surface thereof. As will be developed below, the planetary gear assembly 308 may operate as an epicyclic differential.

An electronic control unit 334 is connected with the gear selector 322, the dual input transmission 312, the brake 330, and the motor 332. The gear selector, under control of the control unit 334, engages and disengages the sun gear 324. When the sun gear is engaged, the planetary gears are engaged to drive the second input shaft 316 to the dual input transmission via the planetary gear carrier 318. When the sun gear is disengaged, the planetary gears are in neutral and do not drive the second input shaft 316 to the dual input transmission. Accordingly, losses associated with the epicyclic/differential are avoided during certain phases of operation.

As set forth above, the planetary gears 326 mesh with the sun gear 324 on the inside and with the ring gear 328 on the outside. The ring gear 328 in turn has gear teeth on its outside which mesh with the motor 332. The speed of the motor 332 and and the speed of the engine 302 are therefore combined by the planetary gear carrier 318 and determine the behavior of the second transmission input shaft 316. Because the planetary gear carrier 318 and the central shaft 306 operate independently and the gear mechanisms alternate sequentially between the inner and outer shafts, shifting of the gears can occur without interrupting the power flow from the engine for smooth transition between the gears. Motor 332 and transmission 312 are under control of the electronic control unit which also receives operator input from sensors on the throttle, brake gear selector and any other useful commonly used inputs for dual clutch, automated or automatic transmissions. These include RPM sensors on various shafts including the dual input transmission output shaft 320, on the motor 332, on the wheels for detecting wheel speed, and on the engine for detecting engine output.

In operation, first gear, which is associated in the transmission with second input shaft 316 and therefore with the planet carrier 322, is selected with the vehicle service brakes applied and motor 332 spins at a speed and in a direction which holds the vehicle still. No other gears are selected. As the operator depresses the accelerator and releases the brake, the motor 332 provides negative torque to the ring gear 328. The vehicle begins to move as the motor 332 and ring gear 328 slow down. When the motor 332 comes to a standstill, the vehicle accelerates or decelerates in direct proportion to engine RPM. This is a description of acceleration which continues as the engine RPM increases. If the motor 332 has enough torque to overcome the engine's torque, then when the engine has reached a certain RPM, the motor can cause the vehicle to continue to accelerate while keeping the engine RPM from increasing further. The motor can also be sized to force the engine to slow. The result is that it is possible for the electronic control unit 334 to then command the gear selector in the transmission 312 to engage second gear. The engine can drive the vehicle though second gear and continue to accelerate while the electronic control unit commands the motor 332 to manipulate the ring gear 328 and planetary gear carrier 318 to go to an RPM appropriate for the smooth engagement of third gear. The process can be repeated as the motor 332 applies negative torque to the ring gear, thus transmitting power through third gear which allows pressure to be taken off second gear so that the transmission 312 may move into a neutral position on its way to engaging fourth gear.

Alternatively, first and second gears are selected with the engine not running. When the operator releases the brake and depresses the accelerator (or gives some other "go" command) the motor 332 spins in the correct direction to make the vehicle move forward. The electronic control unit 334 also commands fuel and spark to the engine which is backdriven through second gear and starts.

On deceleration, the motor 332 is employed to recharge the battery or other storage device 336. A pump, compressor or generator 338 may be included or replace storage device 336 to provide a source of power for motor 332. During a full throttle shift, motor 332 could be commmanded to spin and drive the vehicle forward, while the pump is commanded to send power to the motor 332. Both of these events tend to slow the engine while increasing vehicle speed. The need to reduce engine power for the shift is thereby eliminated, and the vehicle continues to accelerate during both forms of gear engagements. These two forms of engagement are when the motor 332 slows the ring gear 328 to send power through the ratios associated with the second input shaft 316, and when the motor 332 accelerates the ring gear 328 in order that the ratios associated with the second input shaft 316 are synchronized with the engine speed so that a clutch is not needed for their engagement.

A clutch can obviously be included if necessary, and one place to put it would be as the interface between the central shaft 306 and the second input shaft 316. The central shaft 306 may be hollow to accommodate a rod therein. The rod slides back and forth to engagge the clutch, or the bore of the shaft can serve as a galley for fluid used to actuate the clutch. If such a clutch is used, then the motor 332 can be eliminated and only the brake 330 is used. In this embodiment the brake 330 and differential/epicyclic arrangement is analogous to the primary clutch in FIG. 1 and would be used for launching. The clutch is for the less rigorous even gear engagements, and can therefore be dry which is more efficient than the current wet clutches used on dual clutch transmissions. The brake 330 is external and can therefore be easily replaced.

Various software strategies may be applied to this mechanical system to best acheive safety and energy recovery during braking. FIG. 4a represents a multiple ratio hybrid drive which requires only one planetary gear assembly (differential) 308 and one motor. FIG. 4a also represents a multiple gear transmission which allows direct drive with no clutches or torque converters which may also incorporate existing devices. The design in FIG. 2 will allow for a constant engine RPM. The design in FIG. 3 represents one of the various manifestations that are envisioned as part of the present invention, which allow greater design flexibility including utilization of modular construction using commercial industry proven devices.

Although the gearboxes of the invention have been described as being connected with the drive shaft of a vehicle, alternate arrangements may be devised for different applications. For example, in a four wheel drive vehicle or piece of machinery, one gearbox can be connected with the front axle of the vehicle and the other gearbox can be connected with the rear axle of the vehicle. Another example is that different members of the planetary gear type epicyclic differential 308 in FIG. 4a can serve as input and output elements from engine shaft 304 and to input shaft 306 of the transmission. In an alternate embodiment of FIGS. 2, 3, and 4a, a pump or generator may replace or supplement the storage devices.

While the preferred forms and embodiments of the invention have been illustrated and described, it will be apparent to those of ordinary skill in the art that various changes and modifications may be made without deviating from the inventive concepts set forth above.

What is claimed is:

1. A transmission connected with an engine of a vehicle, comprising
   (a) a power splitter connected with the engine and having two outputs;
   (b) a differential device connected with one of the power splitter outputs said differential device including a differential and a motor;
   (c) a clutch connected with the other of the power splitter outputs;
   (d) first and second gearboxes connected with the clutch and the differential device, respectively, and having outputs connected with a drive shaft, said first and second gearboxes including gear mechanisms of different ratios;
   (e) a controller connected with the clutch and the differential device for controlling the torque delivered through the clutch and through the differential device, respectively, to simultaneously control shifting of gear mechanisms within said first and second gearboxes, said differential device further comprises a first brake arranged between said motor and said differential, said motor and first brake operating as a drive mechanism for said differential to control the operation thereof.

2. A transmission as defined in claim 1, wherein said controller is further connected with said motor and with said first brake.

3. A transmission connected with an engine of a vehicle, comprising
   (a) a power splitter connected with the engine and having two outputs;
   (b) a differential device connected with one of the power splitter outputs;
   (c) a clutch connected with the other of the power splitter outputs;
   (d) first and second gearboxes connected with the clutch and the differential device, respectively, and having outputs connected with a drive shaft, said first and second gearboxes including gear mechanisms of different ratios;
   (e) a controller connected with the clutch and the differential device for controlling the torque delivered through the clutch and through the differential device, respectively, to simultaneously control shifting of gear mechanisms within said first and second gearboxes; and (f) a brake mechanism connected with said power splitter to prevent the engine from rotating under certain conditions.

4. A transmission as defined in claim 3, wherein said differential device comprises a differential between the engine and the second gearbox and a motor connected with said differential.

5. A transmission as defined in claim 4, and further comprising a storage device connected with said motor.

6. A transmission as defined in claim 5, wherein said storage device comprises one of a battery, capacitor, air tank, hydraulic reservoir, and accumulator.

7. A transmission as defined in claim 4, wherein said motor comprises one of an electric, air, and hydraulic motor.

8. A transmission as defined in claim 3, wherein said controller is further connected with said first and second gearboxes.

9. A transmission as defined in claim 3, wherein said gear mechanisms of said first and second gearboxes have alternating sequential ratios.

10. A transmission as defined in claim 3, and further comprising a third gearbox connected with one of the outputs of said power splitter, said third gearbox being operable to disconnect said differential and its associated gear mechanisms.

* * * * *